United States Patent
Ford

(10) Patent No.: US 7,243,368 B2
(45) Date of Patent: Jul. 10, 2007

(54) ACCESS CONTROL SYSTEM AND METHOD FOR A NETWORKED COMPUTER SYSTEM

(75) Inventor: Daniel E. Ford, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1128 days.

(21) Appl. No.: 10/113,255

(22) Filed: Mar. 29, 2002

(65) Prior Publication Data

US 2003/0188012 A1   Oct. 2, 2003

(51) Int. Cl.
G06F 7/04 (2006.01)
G06F 15/16 (2006.01)

(52) U.S. Cl. .......................................... 726/3; 709/229

(58) Field of Classification Search ................ 709/229, 709/219, 223
See application file for complete search history.

(56) References Cited

U.S. PATENT DOCUMENTS

| | | | | |
|---|---|---|---|---|
| 6,105,027 A | * | 8/2000 | Schneider et al. | 707/9 |
| 6,178,505 B1 | * | 1/2001 | Schneider et al. | 713/168 |
| 6,199,113 B1 | * | 3/2001 | Alegre et al. | 709/229 |
| 6,401,206 B1 | * | 6/2002 | Khan et al. | 713/176 |
| 6,408,336 B1 | * | 6/2002 | Schneider et al. | 709/229 |
| 6,526,506 B1 | * | 2/2003 | Lewis | 713/153 |
| 6,681,017 B1 | * | 1/2004 | Matias et al. | 380/277 |
| 6,738,908 B1 | * | 5/2004 | Bonn et al. | 726/4 |
| 6,785,728 B1 | * | 8/2004 | Schneider et al. | 709/229 |
| 7,017,183 B1 | * | 3/2006 | Frey et al. | 726/5 |
| 7,058,973 B1 | * | 6/2006 | Sultan | 726/12 |

* cited by examiner

Primary Examiner—Matthew B Smithers

(57) ABSTRACT

An access control system for use with a networked computer system [10] comprises a host [14] of the networked computer system, and a bit stream whereby information is transferred from a source of said bit stream to said host [14], said bit stream bearing a routing label identifying an origin of said bit stream in the computer network. The system further comprises a word integrated with said bit stream, said word including a routing label identifying an origin of said word in the computer network, and an access control module in communication with said host, said access control module operable to make an identification, wherein the identification includes comparing the origin of said bit stream to the origin of said word.

20 Claims, 2 Drawing Sheets

ACCESS CONTROL SYSTEM AND METHOD FOR A NETWORKED COMPUTER SYSTEM

FIELD OF THE INVENTION

The present invention relates generally to access control in networked computer systems and in particular to basic authentication access control systems.

BACKGROUND OF THE INVENTION

Basic authentication access control systems for use with networked computer systems have fallen into disfavor in years past due to the ability of eavesdroppers to acquire passwords with a packet sniffer during the authorization process and later access the networked system with the stolen password. Specifically, a packet sniffer is a wire-tap device that plugs into computer networks and/or receives wireless transmissions, and eavesdrops on the network traffic. Unlike most other network devices that discard packets not addressed to them, the packet sniffer acts like a router to pick up all packets. Protocol analysis then allows it to decode the seemingly random bits of data, remove the addressing labels, and examine the contents. The persistent existence of sniffing technology has, thus, motivated a move toward access control systems with improved ability to thwart eavesdroppers.

Attempts by others to address the problems related to providing access control systems resistant to eavesdroppers have led to the development of Certificated Authorities (CA), which have become the self-lauded, self-proclaimed standard for client-host access control and authorization procedures. Specifically, a trusted third party acts like a notary using a digital signature to issue a certificate containing a public key stated to have a certain value. The recipient of the certificate decrypts the signature using the CA's public key and the algorithm the CA used to perform the encryption, computes a message digest of the certificate contents using the same algorithm used by the CA, and performs a comparison between the computed message digest and the one accompanying the certificate. A match means that the contents of the certificate have not been tampered with, and that the certificate was indeed signed by the CA. Also, based on the trust placed in the CA, the recipient determines that the public key presented in the certificate really belongs to the person named in the certificate. Unfortunately, CAs do not perform this service free of charge, and use of these authorities introduces increased expense compared to password-based systems.

In addition to increased expense, the identification process required for using these certificates can slow down the authorization process significantly. Secure Sockets Layer (SSL), for example, provides a security "handshake" using public-key cryptography for mutual identification and to uniquely generate and exchange a session key. First, the client challenges the server and transmits its choice of encryption algorithms. Second, the server returns its server certificate with an acknowledgement that it can support the algorithms chosen by the client and generates a random connection identifier. Third, the client verifies the server certificate and generates the master session key for generating client and server communication keys, encrypts the master key with the server public key, and transmits it to the server. Fourth, the server decrypts the master session key with its private server key, uses the session key to create the corresponding server key pairs, encrypts the initial client challenge phrase with the server-write key, and returns the encrypted phrase to the client. Fifth, the server requests that the client present a valid client certificate, sending the new challenge with the server-write key, and the client responds with a phrase consisting of 1) a hash of the server challenge phrase plus the client certificate, and 2) the client certificate. The phrase is digitally signed with the client's private key, and the handshake is complete.

Needless to say, all of these encryption and exchange procedures slow down the authorization process, and the degree to which the process is slowed down can have an enormous effect on speed of a server system that frequently initiates and drops connections, such as a Storage Area Network (SAN). In a SAN, for example, the speed of access of a client's stored data can be primarily dependent on the speed of the access control. In addition, the expense involved in using a trusted third party represents an additional burden. Thus, it remains the task of the present invention to provide an identification confirmation system and method for use with a networked computer system that thwarts eavesdroppers without the expense or sacrifice of speed associated with using a third party.

SUMMARY OF THE INVENTION

In accordance with one embodiment of the present invention, an access control system for use with a networked computer system comprises a host of the networked computer system, and a bit stream whereby information is transferred from a source of said bit stream to said host, said bit stream bearing a routing label identifying an origin of said bit stream in the computer network. The system further comprises a word integrated with said bit stream, said word including a routing label identifying an origin of said word in the computer network, and an access control module in communication with said host, said access control module operable to make an identification, wherein the identification includes comparing the origin of said bit stream to the origin of said word.

Further areas of applicability of the present invention will become apparent from the detailed description provided hereinafter. It should be understood that the detailed description and specific examples, while indicating various embodiments according to the present invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE VARIOUS EMBODIMENTS ACCORDING TO THE PRESENT INVENTION

The following description of various embodiments according to the present invention is merely exemplary in nature and is in no way intended to limit the invention, its application, or uses.

Figure 1:
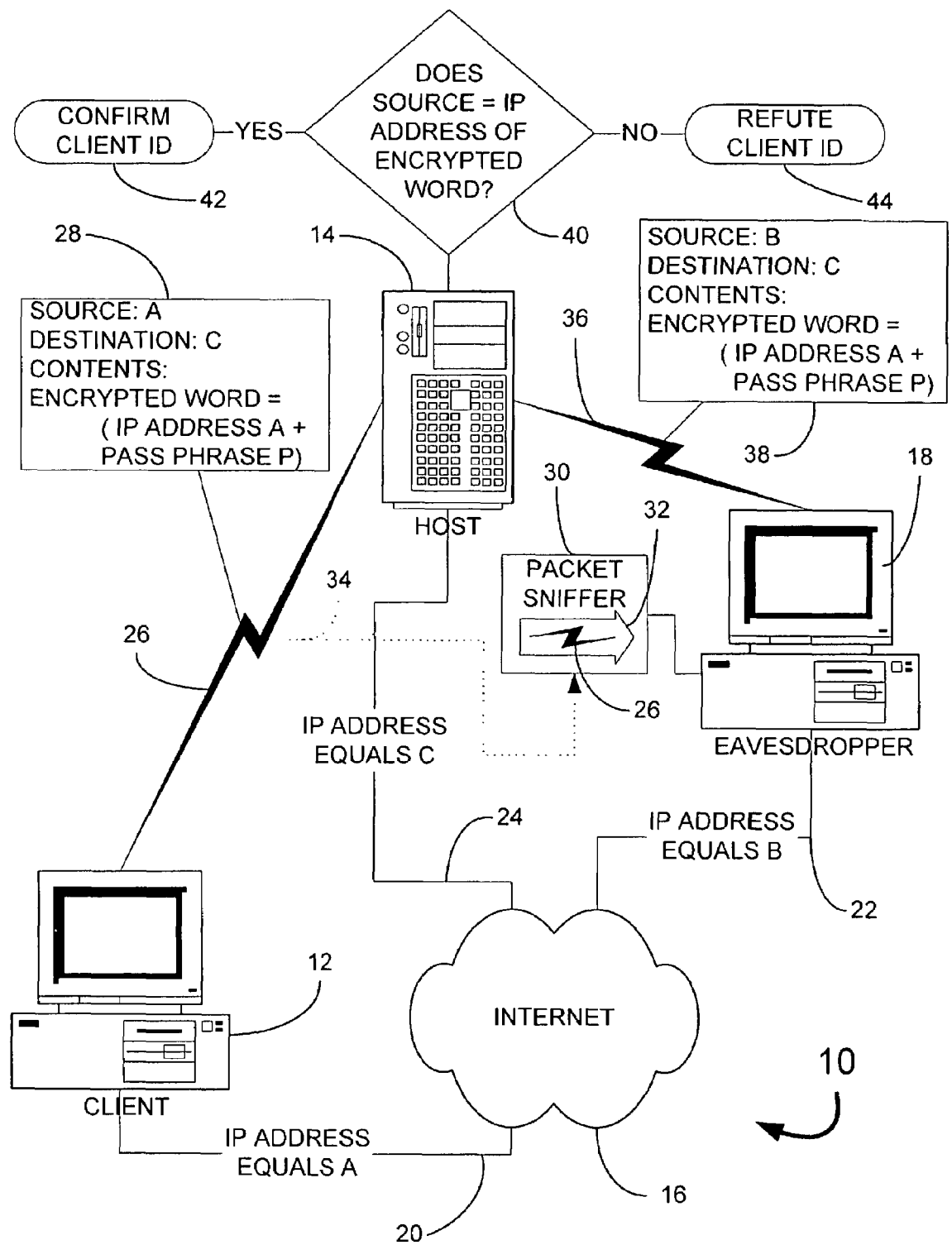
FIG. 1 is a diagram depicting an exemplary implementation of the present invention with a networked computer system.

Referring to FIG. 1, an exemplary implementation of the present invention with a networked computer system 10 is shown. A client 12 communicates with a host 14 via the internet 16 while an eavesdropper 18 is also in communication with the internet 16. Each of the three entities, the client 12, the host 14, and the eavesdropper 18, are connected to the internet via internet access ports, each of which features a different Internet Protocol (IP) address. The client internet access port 20 for example, has an IP address of A, where A represents a thirty-two bit number that is unique among all IP addresses as well understood in the art. Similarly, the eavesdropper internet access port 22 has an IP address of B, where B represents another 32 bit number that is unique among all IP addresses and is therefore different from A. Likewise, the host internet access port 24 has an IP address of C that is different from both B and A.

A client-to-host bit stream 26, is generated by the client and routed through the internet according to the source and destination IP addresses that label the contents of the packet comprising the client-to-host bit stream 26. As shown at 28, the source IP address for the client-to-host bit stream 26 equals A while the destination IP address equals C. Routers distributed throughout the internet 14 receive the client-to-host bit stream 26, decode it using standard internet protocols as well understood in the art, and retransmit it along the most cost efficient path to the destination. As further shown at 28, the contents of the packet include an encrypted word corresponding to the IP address A of the client. Optionally, a password P for accessing the host 14 may be concatenated with the client IP address and included in the encrypted word.

The eavesdropper 18 has a packet sniffer 30 that also receives the client-to-host bit stream 26, via sniffing technology and transfers it to the eavesdropper 18 as shown at 32. As will be readily appreciated by one skilled in the art, the wiretap 34 by which the packet sniffer 30 acquires the client-to-host bit stream 26 may be a hard-wired or wireless connection of the host 14 or the client 12, and can also occur almost anywhere in a share media environment in promiscuous mode where packets are routed in all directions. As will also be readily appreciated by one skilled in the art, the packet sniffer 30 may use protocol analysis to remove the routing labels and examine the contents, permitting the eavesdropper to generate an eavesdropper-to-host bit stream 36. Similarly to the client-to-host bit stream 26, the eavesdropper-to-host bit stream 36 is routed through the internet according to the source and destination IP addresses that label the contents of the packet comprising the eavesdropper-to-host bit stream 36. As shown at 38, the eavesdropper-to-host bit stream 36 is indistinguishable from the client-to-host bit stream 26 save for one feature. In keeping with standard internet protocols, the source IP address of the eavesdropper-to-host bit stream 36 corresponds to B, the IP address of the eavesdropper 18, rather than to A, the IP address of the client 12.

Upon receipt of a bit stream from a source, the host 14 decodes the bit stream according to standard internet protocols and determines the source IP address. After decrypting the encrypted word, the host 14, then need only compare the source IP address to the IP address included in the decrypted word as depicted at 40. If the two IP addresses match, the host 14 may determine that the source is identical to the client as depicted at 42. If the two IP addresses do not match, however, the host 14 may determine that the source is not identical to the client as depicted at 44. Thus, the client-to-host bit stream 26 contains the necessary matching fields to confirm the client's identity, whereas the eavesdropper-to-host bit stream 36 does not contain the necessary fields. As will be readily appreciated by one skilled in the art, further steps regarding client authorization, such as confirming the validity of the password, may be performed before granting access to the client 12.

Figure 2:
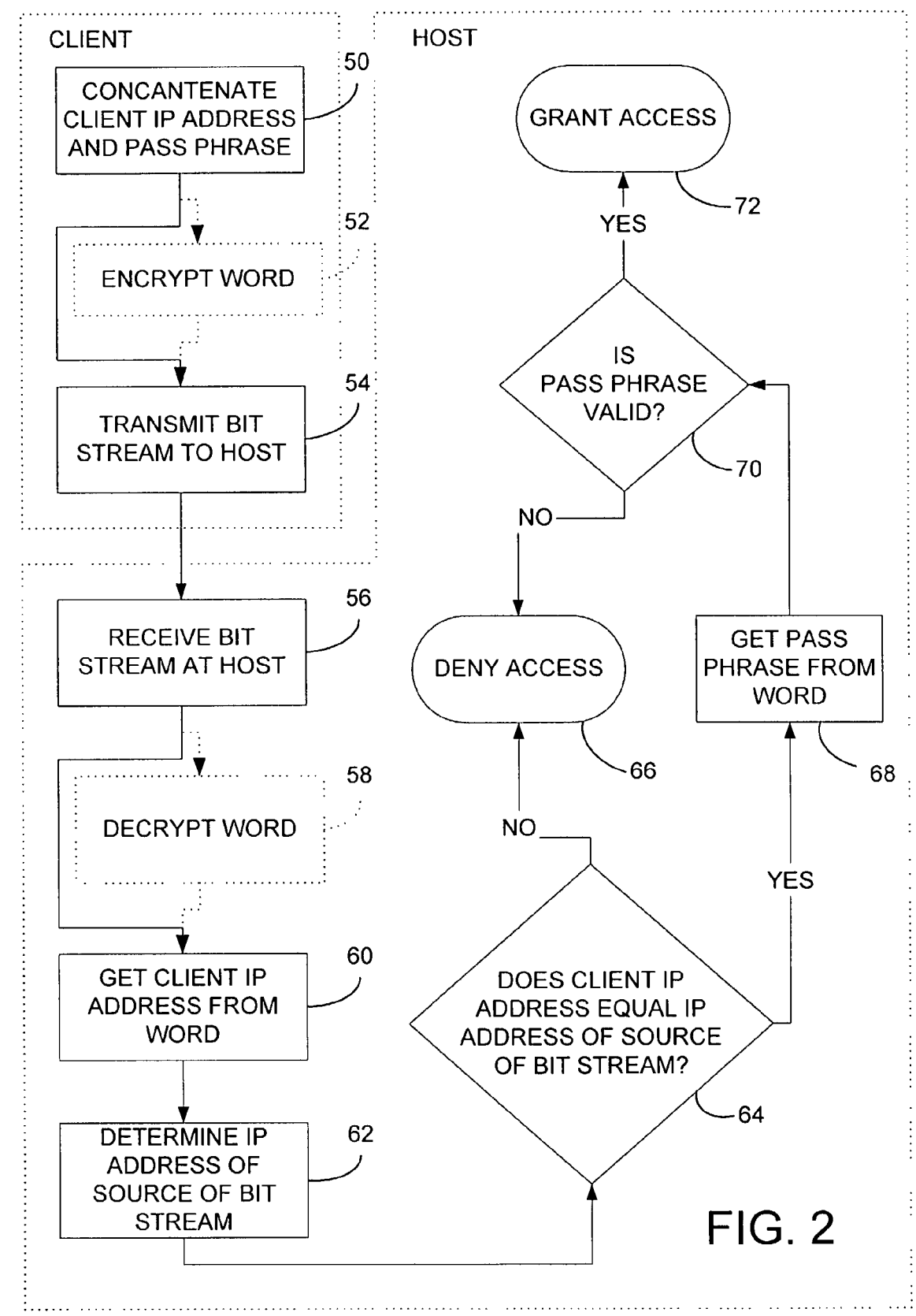
FIG. 2 is a flowchart diagram depicting an exemplary method of operation consistent with the present invention.

Referring to FIG. 2, a flowchart diagram depicting an exemplary method of operation consistent with the present invention is shown. Beginning at step 50, the client concatenates the client IP address with a password for accessing the host to form a word. As will be readily be appreciated by one skilled in the art, it is a simple matter for a client to determine its own IP address, and passwords are generally determined and/or acquired at a time of registration and/or subscription with the host system. Additionally, passwords may be different between clients, associated with a user name, or a common password for the entire system. As will also be readily appreciated by one skilled in the art, passwords may age out at predetermined intervals and be replaced with new ones according to predetermined rules associated with the host system. As will further be readily appreciated by one skilled in the art, concatenation of the routing label and password is optional as inclusion of the password in the word is optional. It may be desirable, for example, to send the password and IP address separately or not to include a password. In one embodiment according to the present invention, however, the password and IP address are concatenated and encrypted to obscure the fact that the IP address is included in the word.

Following formation of the word, the client optionally encrypts the word at step 52. As will be readily understood by one skilled in the art, various methods of encryption exist for accomplishing this purpose, and using a private key known only to the host system and its clients is only one alternative for encrypting the word. Such a private key could be acquired and/or determined at time of registration and/or subscription with the host system, and different keys may exist for different clients of the host system and even for each session. Additionally, use of one or more public keys is also consistent with the system and method of the present invention. Step 52 may also represent integrating the word with other data and encrypting the whole or encrypting the word alone, prior to integration with additional data, where further encryption may occur. Additionally, the IP address and/or password may be encrypted prior to concatenation. Thus, multiple levels of encryption may be supported, further examples of which will be readily appreciated by one skilled in the art.

Following optional encryption of the word, a bit stream containing the word is generated and transmitted to the host at step 54. As noted above with reference to FIG. 1, the bit stream bears routing labels identifying the source and destination IP addresses for the bit stream. The bit stream is subsequently received by the host at step 56, and the word optionally decrypted at step 58. The client IP address is retrieved from the word at step 60, and the IP address of the source of the bit stream is determined at step 62 using standard internet protocols as will be readily appreciated by one skilled in the art. The host determines whether the client IP address matches the IP address of the source of the bit stream as at 64, and, if not, access is denied to the source of the bit stream as at 66. If the client IP address matches the IP address of the source of the bit stream, however, the host gets the password from the word at step 68, and determines whether the password is valid as at 70. As will be readily appreciated by one skilled in the art, this determination may involve comparing the password with a plurality of valid passwords in a password file looking for a single match, comparing the password with a valid password associated with a user name of the client, and various other password validation schemes well known in the art. Thus, if the password is found to be valid, access is granted to the source of the bit stream as at 70. Otherwise, access is denied as at 66.

As will be readily appreciated by one skilled in the art, various additional steps, arrangements of steps, and orders of steps may be accomplished that are consistent with the present invention. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An access control system for use with a networked computer system, the system comprising:
   a host in the networked computer system;
   a source generating a bit stream that is transmitted to the host, said bit stream including (1) a source internet protocol (IP) address of said bit stream in the computer network and (2) a word integrated with said bit stream, said word including an encrypted IP address identifying a location in the computer network; and
   an access control module in communication with said host, said access control module decrypting the encrypted IP address and comparing the source IP address with the decrypted IP address to verify an identity of the source.

2. The system of claim 1, wherein the source is granted access to said server system only if the source IP address is identical to the decrypted IP address.

3. The system of claim 1, wherein the word is formed by linking the decrypted IP address with a password.

4. The system of claim 1, wherein the access control module compares a password encrypted in the word to a plurality of passwords in memory accessible to said host in order to verify the identity of the source.

5. The system of claim 4, wherein the source is granted access to said server system only if the password is identical to at least one valid password.

6. The system of claim 1, wherein a password and the decrypted IP address are concatenated to obscure presence of the encrypted IP address in the word.

7. The system of claim 1, wherein the bit stream includes a routing label having the source IP address and a packet content portion having the encrypted IP address.

8. An access control method for use with a server system over a computer network, the method comprising:
   generating a word that includes an encrypted internet protocol (IP) address of a source;
   receiving a bit stream over the computer network, the bit stream including (1) a source IP address identifying an origin of the bit stream in the computer network and (2) the word including the encrypted IP address of the source; and
   comparing the source IP address to the encrypted IP address to confirm an identity of the source.

9. The method of claim 8, wherein the source IP address is in a routing label and the encrypted IP address is in a packet content portion of the bit stream.

10. The method of claim 8, the method further comprising granting the source access to the server system only if the source IP address is identical to the encrypted IP address.

11. The method of claim 8, wherein the word further includes a password for accessing said server system, the method further comprising comparing the password to a plurality of valid passwords in memory accessible to the server system.

12. The method of claim 11, the method further comprising granting the source access to the server system only if the password is identical to at least one valid password.

13. The method of claim 8, the method further comprising:
   generating the bit stream at a client location, wherein the encrypted IP address of the source-identifies the client location, and
   transmitting the bit stream from the client to a host of the server system.

14. The method of claim 8, the method further comprising concatenating a routing label with a password at client location to generate the word.

15. The method of claim 8 further comprising:
   linking an IP address of the source with a password to form the word;
   encrypting the word to obscure that the IP address is included in the word.

16. The method of claim 8 further comprising:
   if the encrypted IP address included in the word does not match the source IP address, then determining that the source of the bit stream is not identical to a client that generated the word.

17. An access control method for use over a computer network, the method comprising:
   generating a word that includes an encrypted internet protocol (IP) address of a client; receiving a bit stream at a host, the bit stream including (1) a routing label that includes a source IP address and (2) the word with the encrypted IP address; and
   comparing at the host the IP address included in the word with the source IP address included in the routing label to confirm an identify of the client.

18. The access control method of claim 17 further comprising:
   if the IP address included in the word matches the source IP address included in the routing label, then granting access to the bit stream.

19. The access control method of claim 17 further comprising:
   linking the IP address of the client with a password to form the word;
   encrypting the word to obscure that the IP address is included in the word.

20. The access control method of claim 17 further comprising:
   if the IP address included in the word does not match the source IP address included in the routing label, then determining that a source of the bit stream is not identical to the client.

* * * * *